(12) United States Patent
Miyamoto

(10) Patent No.: US 6,575,695 B1
(45) Date of Patent: Jun. 10, 2003

(54) CENTRIFUGAL BLOWER AND POWER WORKING MACHINE

(75) Inventor: Junichi Miyamoto, Togane (JP)

(73) Assignee: Maruyama Mfg. Co., Inc., Tokyo (JP)

( * ) Notice: Subject to any disclaimer, the term of this patent is extended or adjusted under 35 U.S.C. 154(b) by 98 days.

(21) Appl. No.: 09/713,081

(22) Filed: Nov. 7, 2000

(30) Foreign Application Priority Data

Nov. 30, 1999 (JP) .............................. 11-339238

(51) Int. Cl.[7] .................... F04D 29/66; A47L 5/36; A47L 9/00
(52) U.S. Cl. ................... 415/119; 415/204; 415/206; 15/326; 181/252; 239/153; 239/154
(58) Field of Search ................... 415/119, 204, 415/206, 208.1; 15/326; 181/229, 252; 239/152–154, 289

(56) References Cited

U.S. PATENT DOCUMENTS

| | | | | |
|---|---|---|---|---|
| 2,028,985 A | * | 1/1936 | Mahon | 415/119 |
| 2,160,666 A | * | 5/1939 | McMahan | 415/119 |
| 3,174,682 A | * | 3/1965 | Wilfert et al. | 415/119 |
| 3,346,174 A | * | 10/1967 | Lievens et al. | 415/119 |
| 4,508,486 A | * | 4/1985 | Tinker | 415/119 |
| 4,600,129 A | * | 7/1986 | Kondo | 239/153 |
| 4,658,778 A | * | 4/1987 | Gamoh et al. | 239/153 |
| 5,052,073 A | * | 10/1991 | Iida | 15/327.5 |
| 5,361,738 A | * | 11/1994 | Iida | 123/182.1 |
| 5,857,439 A | | 1/1999 | Will et al. | |

FOREIGN PATENT DOCUMENTS

| | | | | |
|---|---|---|---|---|
| AU | 6208/27 A | * | 9/1927 | 15/326 |
| DE | 2209118 A | * | 9/1973 | 415/119 |
| DE | 2556022 A | * | 9/1976 | 415/119 |
| FR | 2505416 A | * | 11/1982 | 415/119 |
| GB | 837369 A | * | 6/1960 | 239/152 |
| GB | 908521 A | * | 10/1962 | 415/119 |
| JP | 53-1309 A | * | 9/1978 | 415/206 |
| JP | 56-146096 A | * | 11/1981 | 415/119 |
| JP | 62-40159 | | 10/1987 | |
| JP | 4-159500 A | * | 6/1992 | 415/119 |
| NL | 6712309 A | * | 3/1968 | 239/152 |

* cited by examiner

*Primary Examiner*—Christopher Verdier
(74) *Attorney, Agent, or Firm*—Rosenthal & Osha L.L.P.

(57) ABSTRACT

A centrifugal blower capable of reducing noise. The centrifugal blower comprises an impeller having a hub plate and a set of blades disposed on at least one surface of the hub plate so as to surround an axis of rotation; and a casing surrounding the impeller and having a volute portion disposed at an outer peripheral portion thereof. The portion of casing facing the set of blades is formed with a plurality of through holes, whereas a sound absorbing material is attached thereto so as to cover the through holes. The noise caused by a compression wave of air occurring between the blades of impeller and the inner face of casing is efficiently absorbed by a sound absorbing material disposed adjacent the blades.

7 Claims, 5 Drawing Sheets

CENTRIFUGAL BLOWER AND POWER WORKING MACHINE

BACKGROUND OF THE INVENTION

1. Field of the Invention

The present invention relates to a power working machine such as a backpack power duster or blower apparatus and, more particularly, is concerned with a centrifugal blower employed in a portable power working machine.

2. Related Background Art

In portable power working machines using a centrifugal blower, various means for reducing noise generated from the centrifugal blower have conventionally been suggested. For example, Japanese Utility Model Publication No. SHO 62-40159 discloses a centrifugal blower having a sound absorbing material disposed adjacent a volute chamber. Also, U.S. Pat. No. 5,857,439 discloses a backpack power working machine having a sound absorbing panel attached to a backpack frame so as to surround a centrifugal blower.

While these conventional techniques can lower the noise generated from the centrifugal blower to a certain extent, there is always a demand that such noise should be reduced as much as possible.

SUMMARY OF THE INVENTION

The inventor has carried out various studies in order to fulfill the above-mentioned demand and, as a result, has found that, if individual blades of an impeller rotate along the inner wall surface of a casing, then a compression wave of air occurs between the impeller and the inner wall surface of the casing, thereby becoming a major factor for the noise.

Therefore, one aspect of the present invention features a centrifugal blower comprising an impeller having a hub plate rotating about an axis, a set of blades disposed on at least one surface of the hub plate so as to surround the axis, and an air inlet defined by inner ends of the blades, the impeller taking air into the air inlet upon rotation so as to discharge the air radially outward; a casing surrounding the impeller, the casing having an intake port communicating with the air inlet and having a volute portion disposed at an outer peripheral portion thereof; and sound absorbing means disposed at a portion of the casing facing the set of blades.

With this arrangement, the noise caused by the compression wave of air occurring between the set of blades of impeller and the inner wall surface of casing can efficiently be absorbed by the sound absorbing means adjacent the set of blades. Also, while the inventor has found that the noise caused by the compression wave of air increases as the gap between the inner wall surface of casing and the set of blades is smaller, such an increase in noise can be avoided in accordance with the present invention even when the inner wall surface of casing is disposed closer to the set of blades. As a result, the blowing power of the centrifugal blower can be enhanced without increasing the noise. It is because of the fact that the loss in energy decreases as the gap between the inner wall surface of casing and the set of blades is smaller, thereby enhancing the blowing power.

Though the sound absorbing means is preferably disposed over the whole area facing the set of blades, it may be disposed at a part of this area.

Preferably, the sound absorbing means comprises a wall portion of the casing, adjacent and opposite the set of blades, formed with a plurality of through holes, and a sound absorbing material disposed on an outer surface of the wall portion.

Another aspect of the present invention features a power working machine comprising a centrifugal blower such as the one mentioned above. Such a power working machine is a backpack power duster or backpack blower apparatus, for example.

These and other features and advantages of the present invention will become apparent to those skilled in the art upon a reading of the following detailed description when taken in conjunction with the drawings wherein there is shown and described illustrative embodiments of the invention.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

In the course of the following detailed description, reference will be made to the attached drawings in which.

DESCRIPTION OF THE PREFERRED EMBODIMENTS

Figure 1:
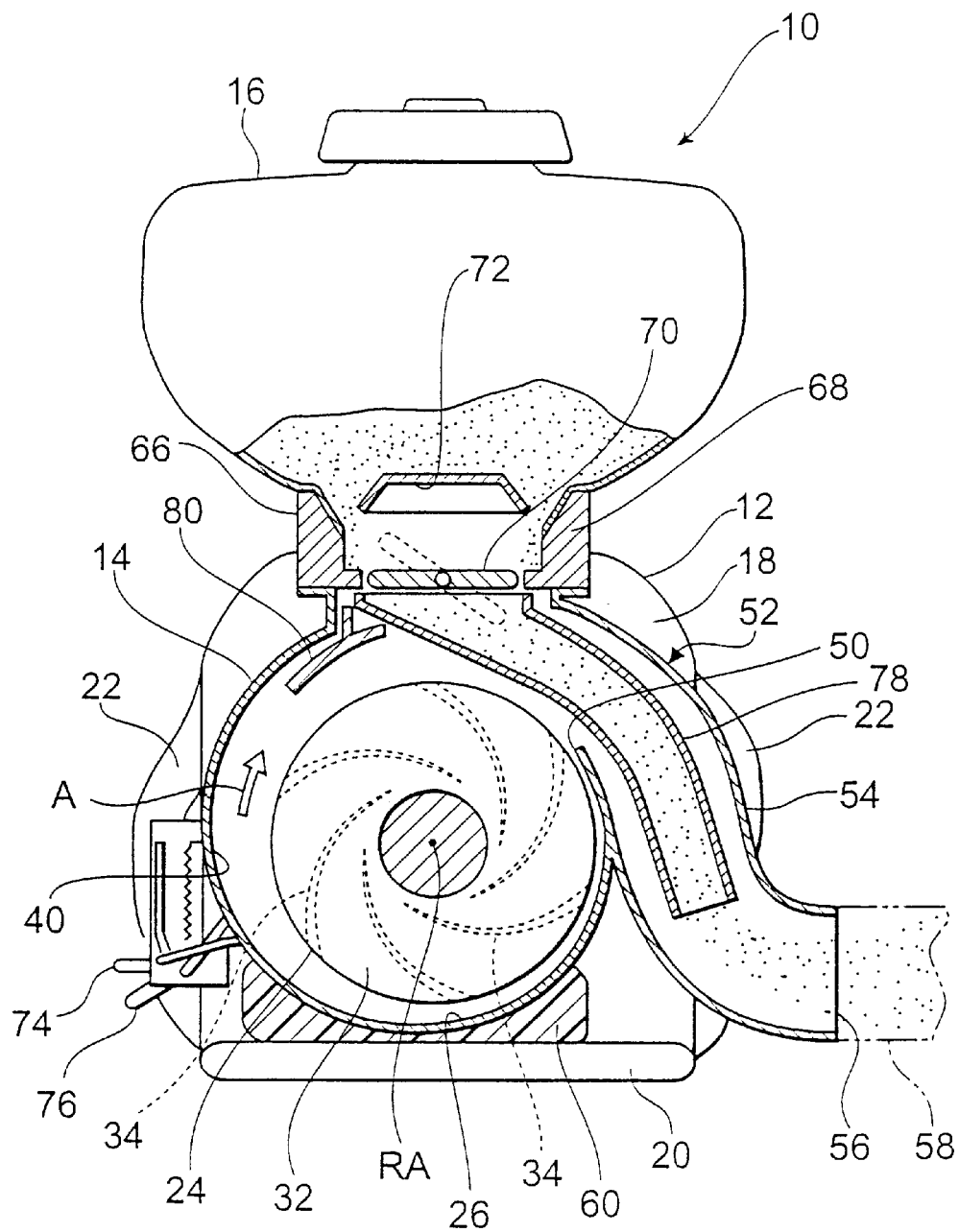
FIG. 1 is a rear view schematically showing, in a partly broken state, a backpack power duster having a centrifugal blower in accordance with the present invention.

Referring now to the drawings, and particularly, to FIG. 1, there is shown a rear view of a backpack power duster being generally designated by the numeral 10, which is a power working machine in accordance with the present invention. The power duster 10 is aimed at spraying an agricultural chemical spray agent in a particle or powder form; and has a backpack frame 12 to be carried on the back of an operator or user, a centrifugal blower 14 of the present invention attached to the backpack frame 12, and a spray agent tank 16 disposed on the upper side of the centrifugal blower 14.

Figure 2:
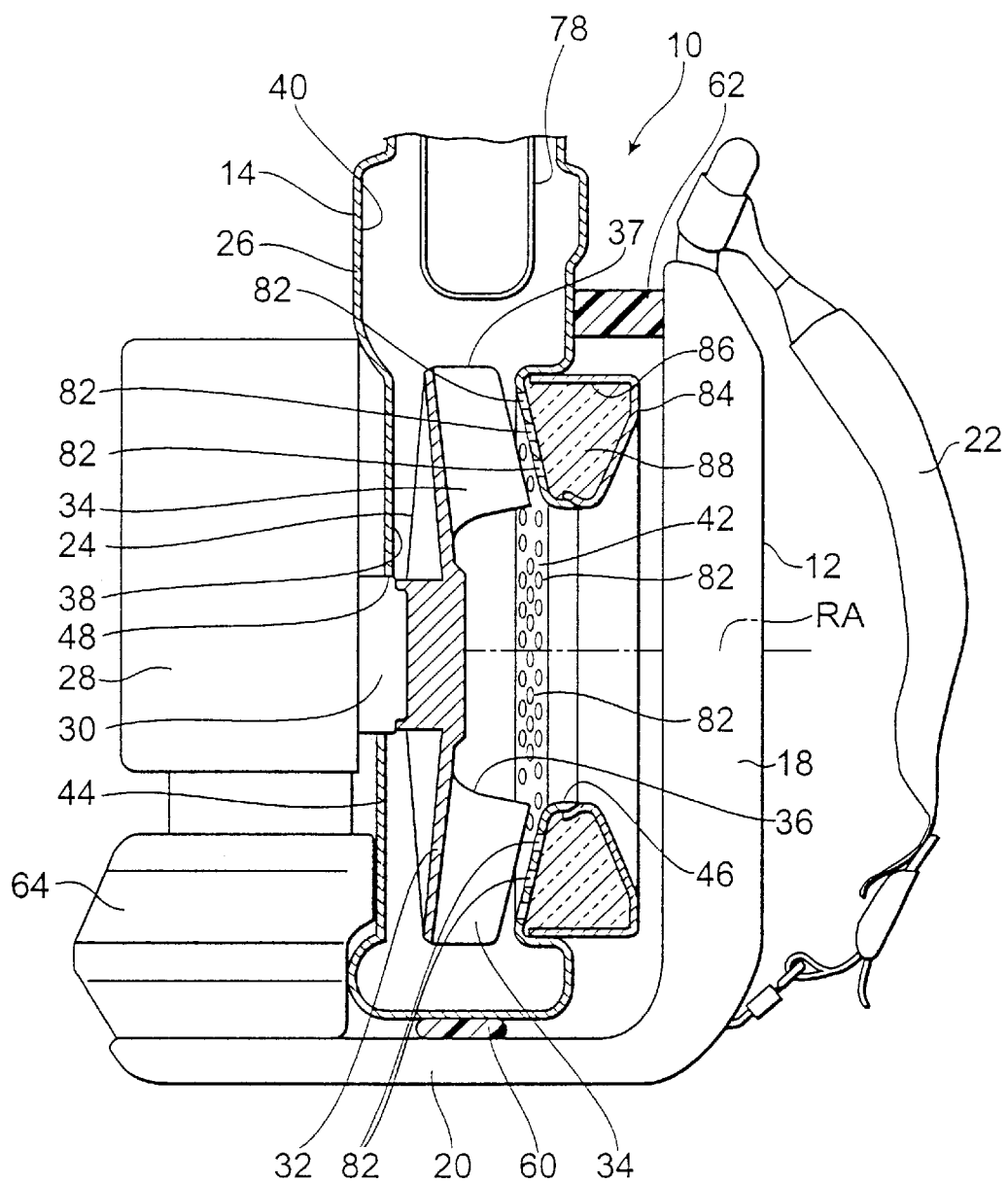
FIG. 2 is a partial side view schematically showing the power duster of FIG. 1, in which the centrifugal blower is illustrated in section.

As clearly shown in FIG. 2, the backpack frame 12 is formed by an L-shaped frame having a first portion 18 and a second portion 20 extending substantially perpendicularly from the lower end of the first portion. A shoulder strap 22 is attached to the first portion 18 such that the operator or user can carry the backpack frame 12 on the back. In a normal state of use in which a standing operator carries the backpack frame 12 on the back, the first portion 18 extends substantially vertically, whereas the second portion 20 extends substantially horizontally away from the back of the operator. In this specification, based on this state of use, the direction in which the second portion 20 extends is defined as rearward for convenience, and words such as "upper," "lower," "front," "left," and "right" will be used accordingly.

As shown in FIGS. 1 and 2, the centrifugal blower 14 has an impeller 24, and a casing 26 for accommodating the impeller 24. The impeller 24 is constituted by a disk-shaped hub plate 32 connected to a rotary shaft 30 of an internal combustion engine 28, and a plurality of blades 34 integrally disposed on one surface of the hub plate 32 at equally spaced angular intervals in its peripheral direction so as to be substantially orthogonal to this surface. The inner end of each blade 34 is disposed at a predetermined distance from the axis of rotation RA of the impeller 24, whereas the space surrounded by the inner ends of blades 34 functions as an air inlet 36. Also, each blade 34 extends outward with its surface being curved so as to be convex in the rotating direction of the impeller 24 (the direction indicated by arrow A in FIG. 1). The gap between adjacent blades 34 in the peripheral direction becomes greater on the radially outer side, wherein the areas between the outer end portions of adjacent blades 34 substantially defining an impeller outlet 37.

The casing 26 has an impeller container portion 38 for accommodating the impeller 24, and a volute portion 40 disposed adjacent the impeller container portion 38 on the radially outside of the latter.

The impeller container portion 38 is defined between a wall portion 42 facing the side edges of blades 34 with a slight gap therebetween, and a wall portion 44 facing the surface of hub plate 32 opposite from the blades 34. The center part of wall portion 42 is formed with an opening which, as an intake port, communicates with the impeller inlet 36. Also, the center part of the other wall portion 44 is formed with an opening 48, through which the rotary shaft 30 of the internal combustion engine 28 penetrates so as to be connected to the center of the hub plate 32. Here, the internal combustion engine 28 is secured to the casing 26 on the outer surface side of the wall portion 44 by appropriate means (not depicted).

The volute portion 40 communicates with the impeller container portion 38, and is defined so as to surround the impeller outlet 37. The outer peripheral portion of the casing 26 is made spiral, such that the flow passage area of volute portion 40, i.e., the area of its cross section taken along the plane including the axis of rotation RA of impeller 24, gradually increases along the rotating direction from a predetermined starting point 50. The trailing end or outlet end of the volute portion 40 indicated by numeral 52 is integrally merged with an air pipe portion 54 extending therefrom. The air pipe portion 54 has a discharge port 56 at its tip. A suitable nozzle (not shown) for spraying an agent is adapted to connect with the discharge port 56 by way of a flexible hose 58.

The centrifugal blower 14 is attached to the backpack frame 12 such that the axis of rotation RA of impeller 24 is directed substantially horizontally while one wall portion 42 faces the first portion 18 of the backpack frame 12. Preferably, the centrifugal blower 14 is mounted on the second portion 20 of the backpack frame 12 by way of a vibration absorbing member, such as a rubber mount 60, for example, and is supported by the first portion 18 of the backpack frame 12 at the upper portion of the casing 26 by way of a vibration absorbing member, such as a rubber mount 62, for example. This state of attachment is desirable in that, since the internal combustion engine 28 is disposed so as to be separated from the body of operator, the vibration and noise of the internal combustion engine 28 are less likely to be transmitted to the operator. Since the operator handles the spray nozzle by the right hand in general, so that the hose 58 passes under the right arm, it is preferred that the casing 26 be positioned such that the discharge port 56 is located on the lower right side of the backpack frame 12. In FIG. 2, the numeral 64 refers to a fuel tank for storing a fuel for driving the internal combustion engine 28, which is attached to the rear part of the second portion 20 of the backpack frame 12.

The spray agent tank 16 is disposed on the upper side of the centrifugal blower 14. The spray agent tank 16 is adapted to store the spray agent therein. Disposed between the spray agent tank 16 and the centrifugal blower 14 is a metering unit 66. The metering unit 66 has a barrel 68 for communicating the lower opening of the tank 16 and the opening formed in the upper portion of the casing 26 of the centrifugal blower 14 to each other, a shutter 70 disposed within the barrel 68, and a shutter cover 72 covering the shutter 70 and having a center portion projecting into the inner space of the tank 16. The barrel 68 also functions as a mount for setting the spray agent tank 16 to the casing 26. The shutter 70 is a so-called butterfly valve, whose angle of rotation can be adjusted so as to regulate the degree by which the lower opening of the barrel 68 is open. As a consequence, the spray agent within the tank 16 flows downward through the gap between the shutter cover 72 and the barrel 68, so as to be supplied into the casing 26 of the centrifugal blower 14 by an amount corresponding to the degree of opening of the shutter 70.

The degree of opening of the shutter 70 can be adjusted by a shutter lever 74. The lever 74 is disposed on the lower left side of the backpack frame 12 so as to be operable by the left hand of the operator carrying the power duster 10 on the back. A lever 76 disposed adjacent the shutter lever 74 is a throttle lever for the operator to adjust the degree of opening of the throttle valve of the engine 28, so as to regulate the engine output.

Disposed within the volute portion 40 of the casing 26 in the depicted backpack power duster 10 is a transport pipe 78 for guiding to the discharge port 56 of the casing 26 the spray agent falling down through the metering unit 66 from the spray agent tank 16. The transport pipe 78 has one end disposed so as to face the lower opening of the barrel 68 with a predetermined gap therebetween and the other end disposed in the vicinity of the discharge port 56.

A flow divider 80 is disposed at a location adjacent the lower opening of the barrel 68 and upstream the transport pipe 78 (on the side opposing the direction of arrow A) within the volute portion 40. The flow divider 80 functions so as to cause a part of the air flow directed to the discharge port 56 in the volute portion 40 to branch off so as to flow into the spray agent tank 16 from the lower opening of the metering unit 66.

Figure 3:
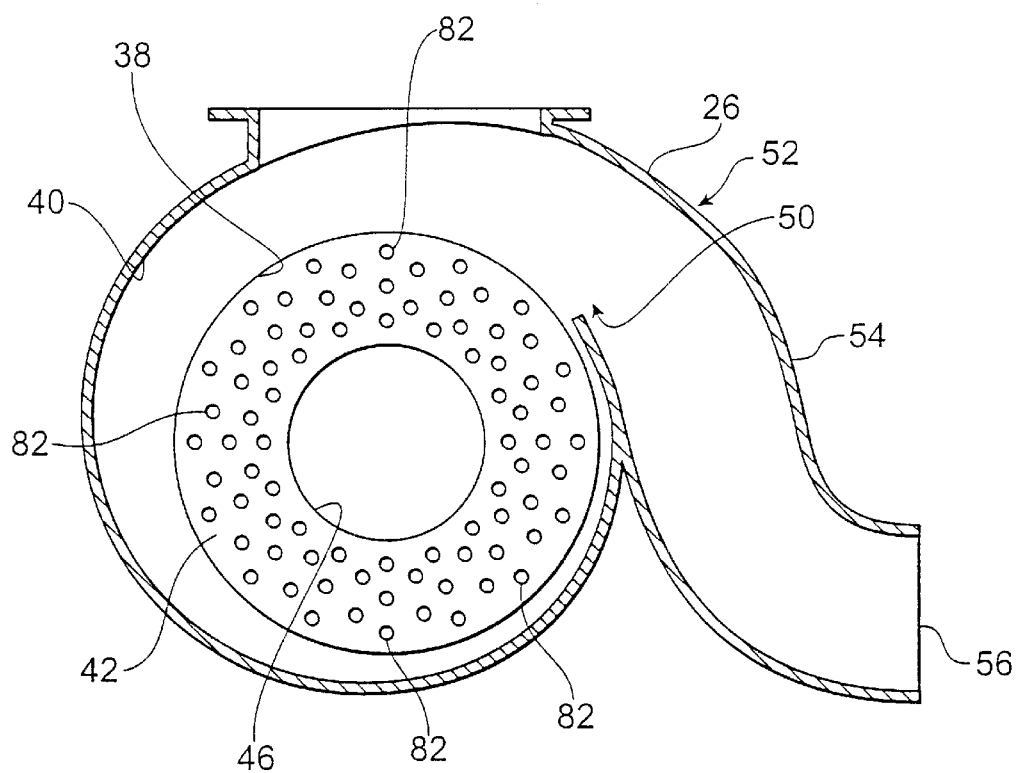
FIG. 3 is a sectional view showing through holes provided in the casing of the centrifugal blower.

Further, in the present invention, the front wall portion 42 defining the impeller container 38 is formed with a number of through holes or perforations 82. It is preferred that, as shown in FIG. 3, these through holes 82 be distributed uniformly over the whole area of the front wall portion 42, i.e., the area of casing 26 adjacent and opposite the set of blades 34 of the impeller 24. Though the through holes 82 typically have a circular form, they may also be in other forms such as rhombic, elongated, square, and triangular forms.

An annular cover 84 is attached to the front wall portion 42 of the casing 26 on the outside thereof. A continuous annular sound absorbing chamber 86 is formed between the front wall portion 42 and the cover 84. The sound absorbing chamber 86 communicates with the impeller container portion 38 of the casing 26 by way of the through holes 82. Disposed within the sound absorbing chamber 86 is a sound absorbing material 88. Preferable as the sound absorbing material 88 is those made of glass wool, felt material, urethane, and the like, which have conventionally been known. It is desirable that such a sound absorbing material 88 be disposed within the sound absorbing chamber 86 without gaps.

If the internal combustion engine 28 is driven so as to rotate the impeller 24 in thus configured backpack power duster 10, then air passes through the gap between the first portion 18 of backpack frame 12 and the centrifugal blower 14 and spray agent tank 16, so as to be taken into the impeller inlet 36 from the intake port 46 of the casing 26. Subsequently, the air is sent radially outward between the blades 34 under pressure. Here, a plurality of blades 34 move in the vicinity of the inner surface of the front wall portion 42 of casing 26, so that a compression wave of air is formed between the impeller 24 and the front wall portion 42, whereby noise is generated. In the shown centrifugal blower 10, in particular, the gap between the front wall portion 42 and the side edges of impeller blades 34 is made smaller in order to reduce the loss in the air flow from the impeller inlet 36 to the outlet 37, whereby the compression wave of air yields a considerably large energy. However, this noise propagates by way of the through holes 82 formed in the front wall portion 42, so as to be absorbed by the sound absorbing material 88. Though the major part of noise caused by compression waves has conventionally been diffused outside by way of the front wall portion 42, such noise is greatly reduced in accordance with the present invention.

The air sent outward under pressure by the impeller 24 merges at the volute portion 40 of the casing 26. The air introduced into the volute portion 40 passes through the air pipe portion 54 along the direction indicated by arrow A in FIG. 1, so as to flow into the discharge port 56.

On the other hand, when the shutter lever 74 is operated so that the degree of opening of the shutter 70 can be adjusted, the spray agent within the tank 16 flows down through the gap between the shutter cover 72 and the barrel 68, so as to be supplied into the casing 26 of the centrifugal blower 14 by the amount corresponding to the degree of opening of the shutter 70. Then, by way of the transport pipe 78, the spray agent merges with the air flow in the vicinity of the discharge port 56, so as to be sprayed through the hose 58 and nozzle.

The flow divider 80 causes a part of the air flow flowing through the volute portion 40 to pass through the gap between the shutter cover 72 and the barrel 68 from the lower part of the barrel 68, so as to flow into the spray agent tank 16. As a consequence, the spray agent within the spray agent tank 16 is stirred, so that clogging is prevented from occurring between the shutter cover 72 and the barrel 68, whereby the spray agent can be supplied smoothly.

The above-mentioned embodiment employs a configuration in which the cover 84 is attached to the front wall portion 42 of the casing 26 forming the impeller container 38. It is due to the fact that, since the configuration excluding the through holes 82, cover 84, and sound absorbing material 88 is identical to the conventional one, a conventional design can be utilized effectively. However, the casing 26 can employ a configuration such as the one shown in FIG. 4.

Figure 4:
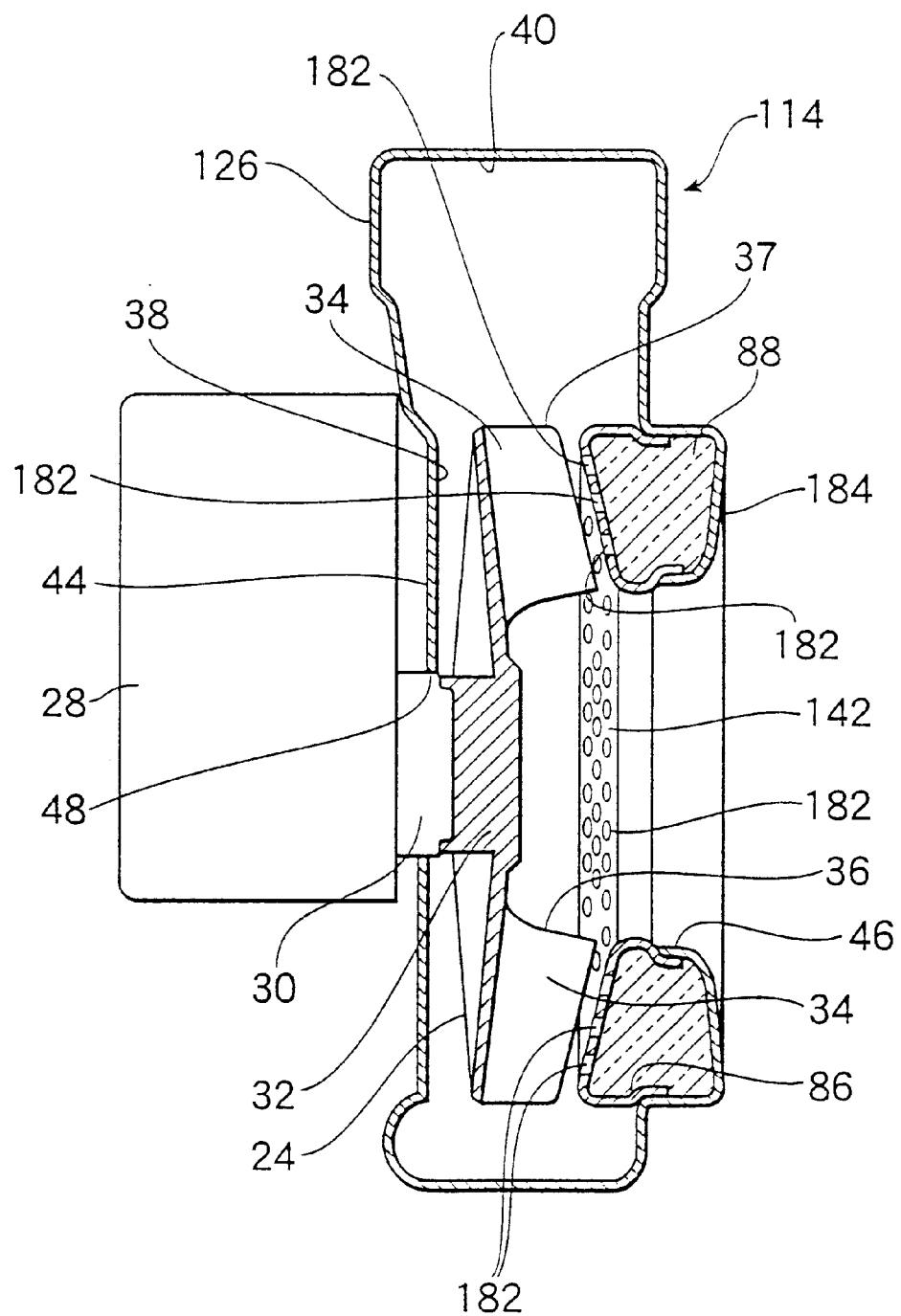
FIG. 4 is a sectional view schematically showing a modification of the centrifugal blower.

In the casing 126 of the centrifugal blower 114 shown in FIG. 4, a part 184 corresponding to the cover 84 of the configuration shown in FIGS. 1 to 3 is integrally formed with the casing 126, and a member 142 corresponding to the above-mentioned front wall portion 42 is secured to this part 184. While operations and effects of the casing 126 to which the member 142 is attached are not different from those of the one shown in FIGS. 1 to 3, the member 142 is advantageous in that, since it is replaceable, it can easily be exchanged with another member having through holes 182 whose number, size, and arrangement differ from those of the former member. In FIG. 4, parts identical or equivalent to those in FIGS. 1 to 3 are referred to with numerals identical thereto without repeating their detailed explanations.

Figure 5:
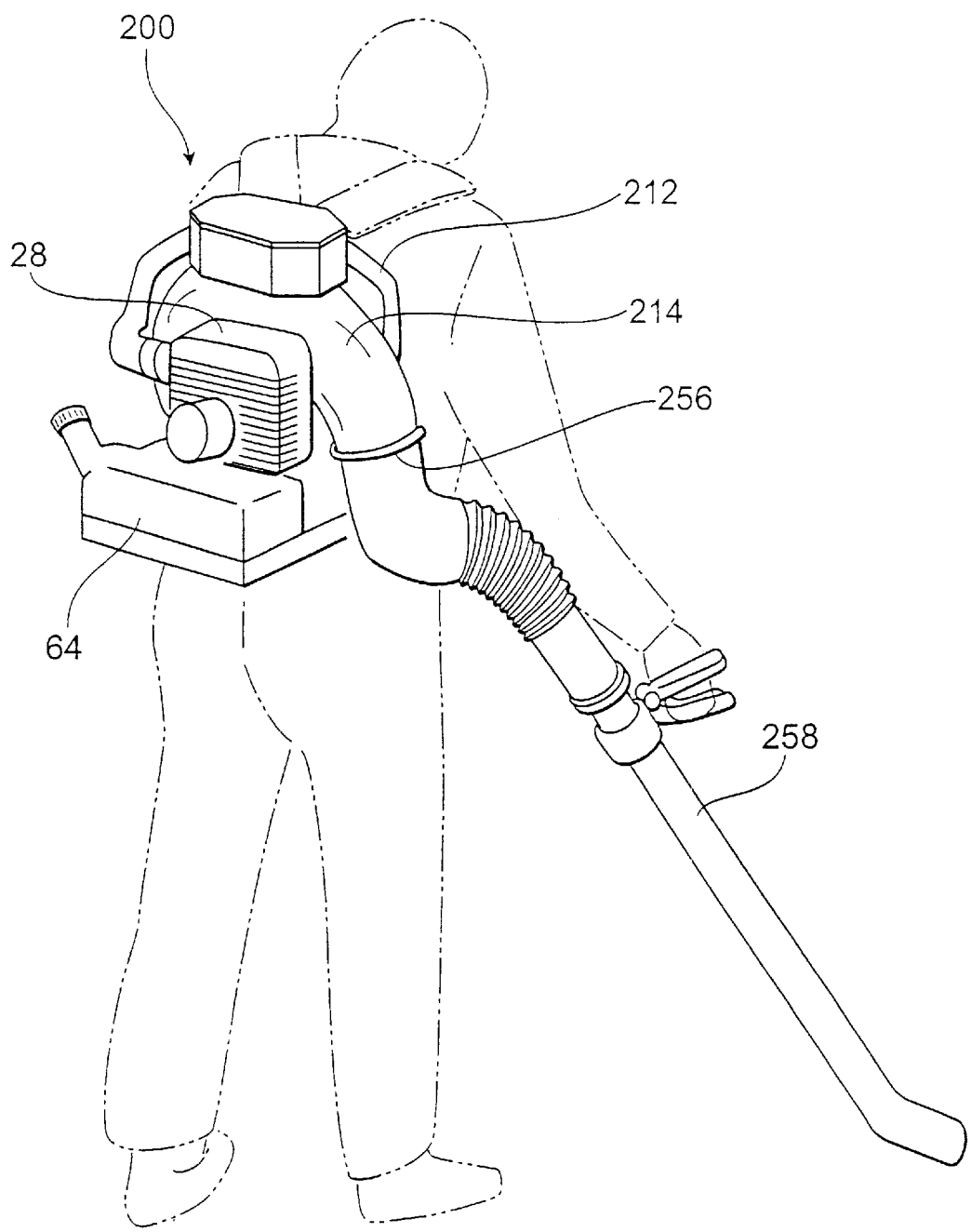
FIG. 5 is a perspective view showing a backpack blower apparatus having a centrifugal blower in accordance with the present invention.

Though the above-mentioned embodiment relates to a backpack power duster, the centrifugal blower 14 or 114 in accordance with the present invention is also applicable to other power working machines. For example, the centrifugal blower of the present invention is also applicable to a blower apparatus of a type which jets out air, so as to collect fallen leaves, cut grass, and wastes at a desirable location. FIG. 5 is a perspective view showing such a blower apparatus 200. The depicted blower apparatus 200 is of a backpack type and is substantially the same as the power duster 10 shown in FIGS. 1 to 3 except for the lack of the spray agent tank, metering unit, spray nozzle, and hose. Namely, the blower apparatus 200 comprises a backpack frame 212, a centrifugal blower 214, equivalent to that shown in FIGS. 1 to 3, attached to the backpack frame 212; and an air jet tube 258 attached to a discharge port 256 of the centrifugal blower 214 in place of the hose and nozzle; and is capable of blowing fallen leaves and cut grass to move as the direction of the opening at the end part of the tube 258 is adjusted. Since such a leaf blower apparatus 200 is usually used in town, it will be extremely preferable if it is equipped with the centrifugal blower of the present invention yielding high noise reduction effects. As a matter of course, the centrifugal blower of the present invention is also applicable to hand-held type blower apparatus.

Though the sound absorbing means comprises the wall portion of casing having through holes and the sound absorbing material in the above-mentioned embodiment, it is not necessary to form though holes in the case where the thickness of wall portion is small, and the like.

The term "blower" used in this specification encompasses "fan." It is because of the fact that they only differ from each other in the range of discharge pressure or the range of pressure ratio, and their structural difference is small.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A power working machine comprising a centrifugal blower, a driving source for driving said centrifugal blower, and a backpack frame having a first portion adapted to be carried on a back of a user and a second portion extending from one end of said first portion, said centrifugal blower and said driving source being mounted on said second portion of said backpack frame, said centrifugal blower comprising:

an impeller having a hub plate driven by said driving source to rotate about an axis, a set of blades disposed on at least one surface of said hub plate so as to surround said axis, and an air inlet defined by inner ends of said blades, said impeller taking air into said air inlet upon rotation so as to discharge said air radially outward;

a casing surrounding said impeller, said casing having an intake port communicating with said air inlet and having a volute portion disposed at an outer periphery thereof, said casing being mounted on said second portion of said backpack frame such that the intake port is directed to said first portion of said backpack frame; and sound absorbing means disposed at only a portion of said casing which is adjacent and opposite said set of blades and which is between said first portion of said backpack frame and said set of blades.

2. A power working machine according to claim 1, wherein said sound absorbing means comprises a wall portion of said casing, adjacent and opposite said set of blades, formed with a plurality of through holes, and a sound absorbing material disposed on an outer surface of said wall portion.

3. A power working machine according to claim 2, wherein said sound absorbing material is packed into a sound absorbing chamber defined by the outer surface of said wall portion of said casing.

4. A power working machine according to claim 3, wherein said sound absorbing chamber is a continuous annular chamber centered at said axis of rotation of said impeller.

5. A power working machine according to claim 2, wherein said sound absorbing material is formed from glass wool, a felt material, or urethane.

6. A power working machine according to claim 1, wherein said power working machine is a backpack power duster.

7. A power working machine according to claim 1, wherein said power working machine is a backpack blower apparatus.

* * * * *